United States Patent [19]

Sato

[11] Patent Number: 5,402,953
[45] Date of Patent: Apr. 4, 1995

[54] SHAFT SUPPORTING STRUCTURE FOR A FISHING REEL

[75] Inventor: Jun Sato, Sakai, Japan

[73] Assignee: Shimano Inc., Osaka, Japan

[21] Appl. No.: 210,775

[22] Filed: Mar. 21, 1994

Related U.S. Application Data

[63] Continuation of Ser. No. 905,372, Jun. 29, 1992, abandoned.

[30] Foreign Application Priority Data

Jul. 2, 1991 [JP] Japan .................. 3-050840 U

[51] Int. Cl.⁶ ......................................... A01K 89/015
[52] U.S. Cl. .................................. 242/321; 384/126
[58] Field of Search ............... 242/321; 384/192, 495, 384/102, 126

[56] References Cited

U.S. PATENT DOCUMENTS

| | | | |
|---|---|---|---|
| Re. 31,920 | 6/1985 | Noda | 242/321 |
| 3,966,140 | 6/1976 | Coquelet | 242/321 |
| 4,035,040 | 7/1977 | Yarris | 384/495 |
| 4,421,285 | 12/1983 | Noda | 242/321 |
| 4,548,518 | 10/1985 | Raveinale | 384/536 |
| 4,555,189 | 11/1985 | Donkia | 384/495 |
| 4,796,722 | 1/1989 | Keumagai | 384/541 |

FOREIGN PATENT DOCUMENTS 1-140261  9/1989  Japan .

*Primary Examiner*—Joseph J. Hail, III
*Attorney, Agent, or Firm*—Dickstein, Shapiro & Morin

[57] ABSTRACT

A shaft supporting structure for a fishing reel includes bearings for supporting flange-like journals of a spool shaft. Each of the bearings defines a supporting surface having a larger area than a peripheral contacting surface of each journal. Each journal has a smaller width than an axial length of the supporting surface, and is disposed centrally of the supporting surface.

8 Claims, 4 Drawing Sheets

SHAFT SUPPORTING STRUCTURE FOR A FISHING REEL

This application is a continuation of application No. 7/905,372, filed Jun. 29, 1992, now abandoned.

BACKGROUND OF THE INVENTION

1. Field of the Invention

This invention relates to a shaft supporting structure for a fishing reel, and more particularly to a shaft supporting structure for a fishing reel in which a rotary element for winding a fishing line is supported through bearings.

2. Description of the Related Art

In a conventional construction having bearings for supporting a rotary element for winding a fishing line a spool acting as the rotary element is mounted on a spool shaft to be rotatable therewith, and journals of the spool shaft are supported by the bearings. Each journal of the spool shaft, has an outer peripheral surface in contact with an entire inner peripheral surface of an inner race of one of the bearings (Japanese Utility Model Publication Kokai No. 1989-140261).

The construction in which each journal of the spool shaft contacts an entire area of the inner peripheral surface which acts as a receiving surface of the inner race of one of the bearings has the following drawback. Inspection has been made of the way in which the journals of the spool shaft rotate relative to the bearings. It has been found as a result that, when the spool is rotated freely without winding a fishing line or when the spool is rotated in a light load condition for casting a bait, for example, the inner race of each bearing does not rotate relative to the outer race but each journal of the spool shaft rotates relative to the inner peripheral surface of the inner race. This tendency is particularly notable at times of light load and low speed rotation.

Thus, a strong resistance acts on the rotation where each journal of the spool shaft is supported by an entire area of the inner peripheral surface of the inner race. There is room for improvement to diminish such resistance.

SUMMARY OF THE INVENTION

The object of the present, invention is to provide a shaft supporting structure for a fishing reel with a simple modification made to journals of a rotary element to diminish rotational resistance, thereby promoting smooth free rotation of the rotary element and increasing a bait casting distance.

The above object is fulfilled, according to the present invention, by a shaft supporting structure for a fishing reel comprising bearings for supporting journals of a rotary element for winding a fishing line, wherein each of the bearings includes a supporting surface having a larger area than a surface of each of the journals.

In the above construction, each journal rotatable relative to one of the bearings defines a surface having a smaller area than the supporting surface of the bearing, Thus, the contacting surfaces for relative rotation are limited to that small area. As a result, the rotational resistance is diminished compared with the prior art in which the journal surface is in contact with the entire bearing surface.

The shaft supporting structure according to the present invention realizes a fishing reel having an improved basic performance and product value, with the spool freely rotatable in a smooth way. This fishing reel also has an improved operability to provide an excellent casting performance.

Other features and advantages of the present invention will be apparent from the following description of the preferred embodiment.

DETAILED DESCRIPTION OF THE PREFERRED EMBODIMENT

A shaft supporting structure for a fishing reel according to the present invention will be described in detail with reference to the drawings.

Figure 1:
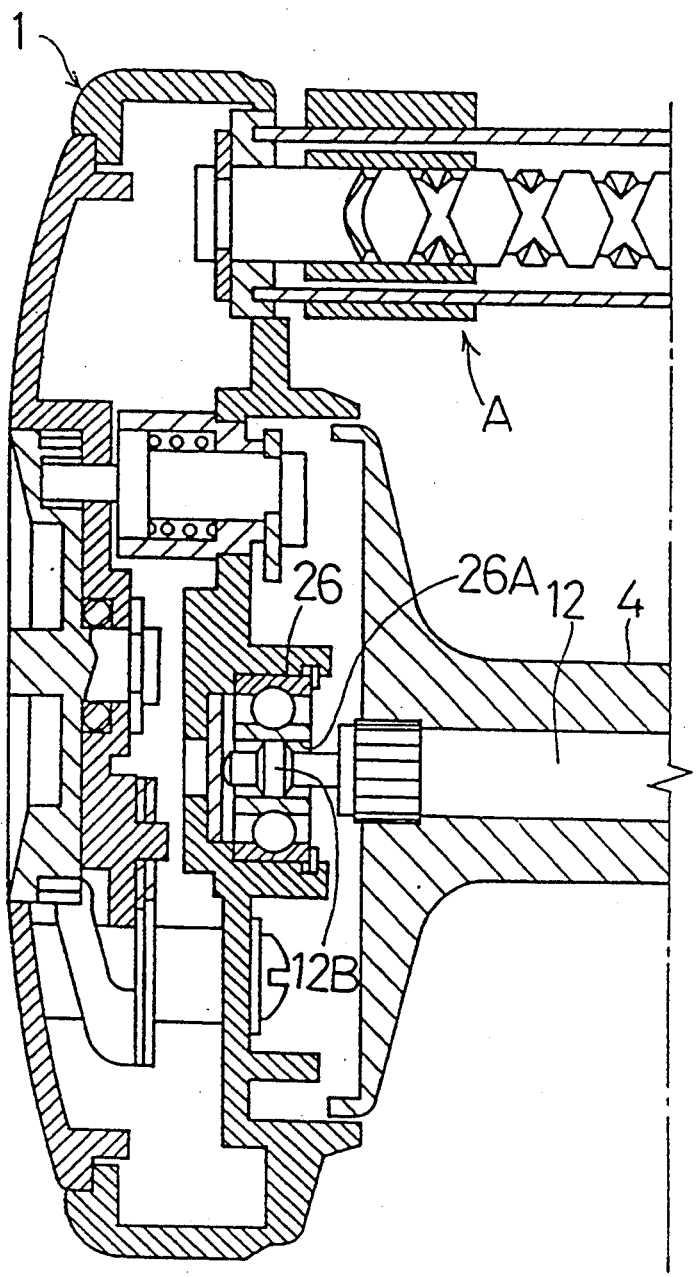
FIG. 1 is a plan view in cross section of a left side body of a fishing reel.
Figure 2:
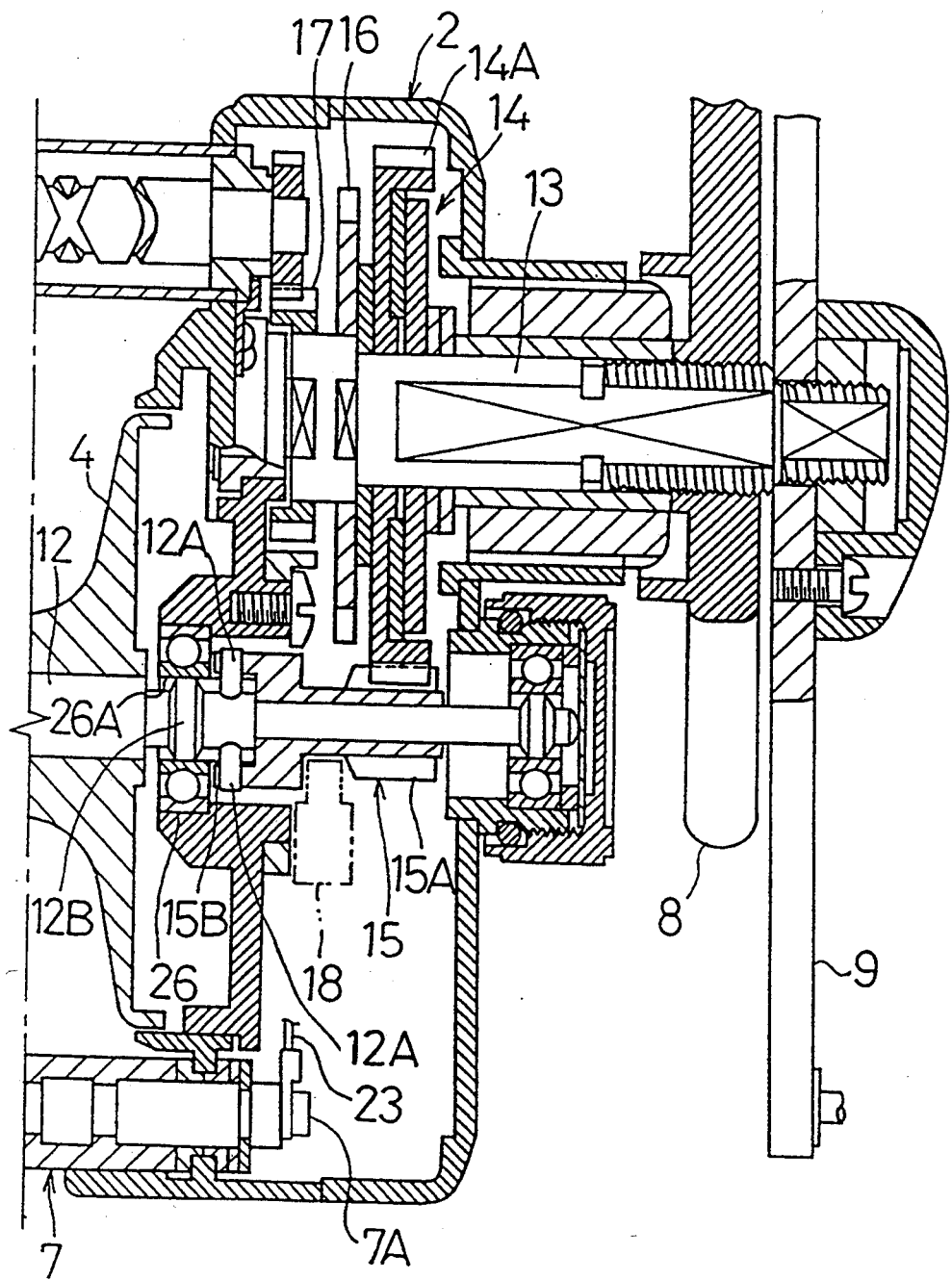
FIG. 2 is a plan view in cross section of a right side body of the fishing reel.
Figure 4:
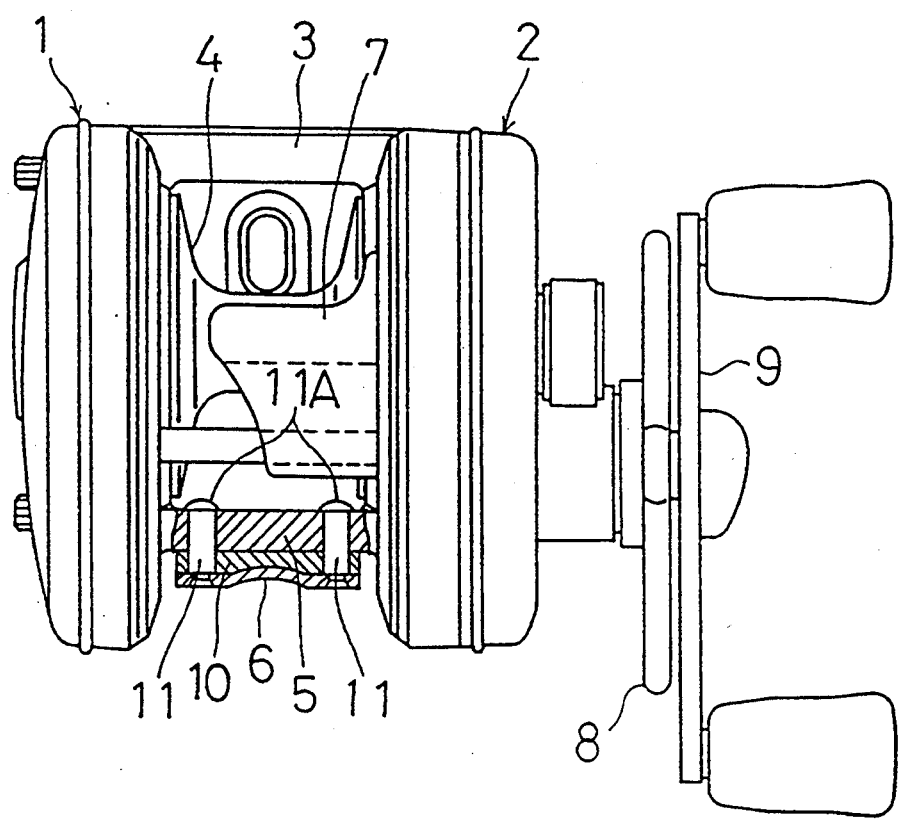
FIG. 4 is a rear view of the fishing reel.

FIGS. 1, 2 and 4 show a fishing reel in one embodiment of the invention. The reel comprises a left side body 1 and a right side body 2, both having an approximately circular shape, and constituting a reel body. The side bodies 1 and 2 are interconnected through a connecting frame 3 acting also as a thumb rest. A spool 4 is mounted between the side bodies 1 and 2 to act as a rotary element. A pair of front and rear lower frames 5 extend between the side bodies 1 and 2 rearwardly of the spool 4. A mounting foot 6 is attached to the lower frames 5 to be secured to a reel seat of a fishing rod. The right side body 2 supports a clutch controller 7, a drag controller 8 and a line winding handle 9 constituting a spool driving system.

An attachment structure for the lower frames 5 and mounting foot 6 will be described next.

As shown in FIG. 4, a metallic reinforcing plate 10 is mounted between the lower frames 5 and mounting foot 6. Head pins 11 extend through the lower frames 5 to the mounting foot 6, with forward ends of the pins 11 caulked to be flush with a lower surface of the mounting foot 6. In this way, the reinforcing plate 10 increases the strength with which the reel is attached to the fishing rod. The forward ends of the pins 11 may be fixed in place by means of screws. The pins 11 have heads 11A rounded into a bowl shape to avoid twining of a fishing line thereon.

Figure 3:
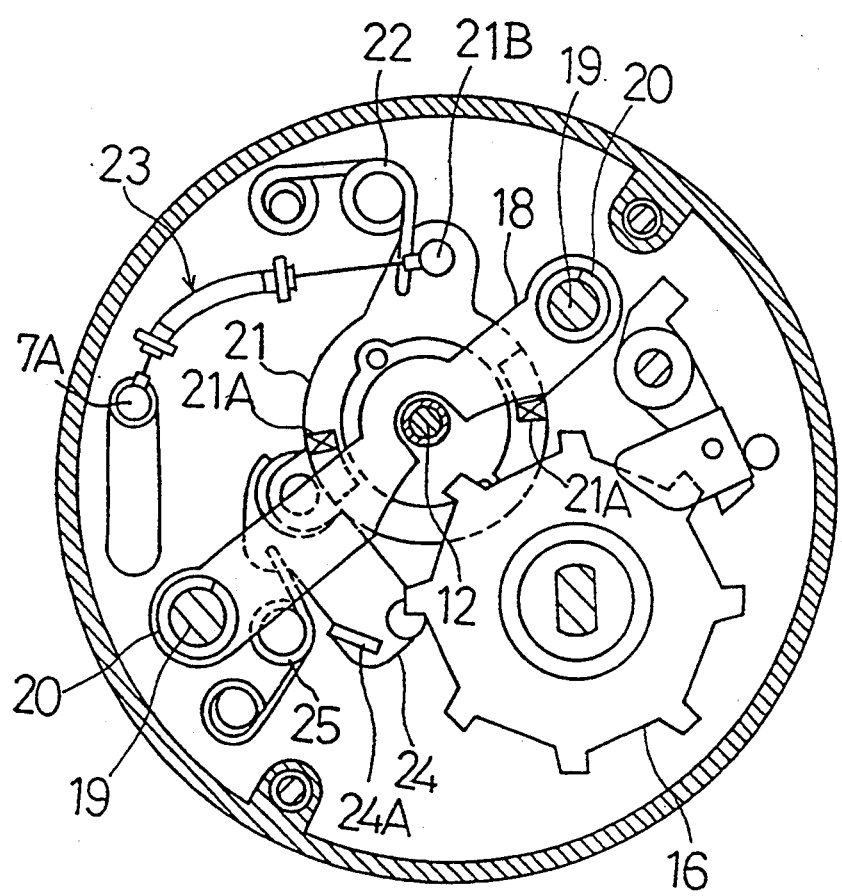
FIG. 3 is a side view in vertical section of the right side body.

The spool driving system will be described next. As shown in FIGS. 2 and 3, a spool shaft 12 extends between the left and right side bodies 1 and 2 for supporting the spool 4 to be rotatable with the spool shaft 12. The right side body 2 supports a main shaft 13 extending parallel to the spool shaft 12. The drag controller 8 and line winding handle 9 are attached to the main shaft 13. The main shaft 13 also supports a multidisk type drag device 14. The drag device 14 has an output gear 14A meshed with a gear portion 15A of a clutch sleeve 15 mounted on the spool shaft 12, thereby forming a drive transmitting line from the main shaft 13 to the spool shaft 12. Numeral 16 denotes an anti-reversing ratchet wheel. Numeral 17 denotes an output gear for driving a level wind mechanism A.

A clutch structure provided on the spool driving system will be described next. As shown in FIGS. 2 and 3, the clutch sleeve 15 is axially slidably mounted on the spool shaft 12. The clutch sleeve 15 has recesses 15B formed in a side surface thereof, while the spool shaft 12 has two engaging pins 12A projecting from outer peripheries thereof for engaging the recesses 15B. The engagement between the recesses 15B and pins 12A provides a clutch engaging state. A declutching state is produced by sliding the clutch sleeve 15 out of engagement with the pins 12A.

The clutch sleeve 15 is drivably engaged with a clutch yoke 18 slidably supported on parallel support shafts 19 and biased to a clutch engaging position by springs 20. A ring cam 21 is rotatably mounted on the spool shaft 12 adjacent the clutch yoke 18. The ring cam 21 defines cam surfaces 21A peripherally thereof for driving the clutch yoke 18 with rotation of the ring cam 21.

A first toggle spring 22 acts on the ring cam 21 to set the ring cam 21 to a position corresponding to the clutch engaging position and to a position corresponding to the declutching position. The ring cam 21 has a pin 21B projecting therefrom, while the clutch controller 7 has a pin 7A projecting into an interior of the right side body 2. The two pins 7A and 21B are operatively connected through a release wire 23. The clutch is engaged when the clutch controller 7 is set to an upper control position, and is disengaged when the clutch controller 7 is depressed to a lower control position. The construction in which the ring cam 21 and clutch controller 7 are interconnected through the release wire 23 has the advantages of allowing selection of a direction in which an operating force is transmitted, and lessening limitation to the arrangement of components. A return arm 24 is connected to the ring cam 21. The return arm 24 has a pin 24A projecting therefrom to a position for contacting the ratchet wheel 16. According to this construction, when the handle 9 is turned to wind the fishing line, the ring cam 21 is automatically returned to the clutch engaging position. Numeral 25 denotes a second toggle spring for acting on the return arm 24.

As shown in FIGS. 1 and 2, the spool shaft 12 is supported by rolling type bearings 26 attached to the left and right side bodies 1 and 2. Each bearing 26 includes an inner race having an inner peripheral surface 26A for contacting and supporting a journal surface 12B of the spool shaft 12. This journal surface 12B has a greater diameter than adjacent portions of the spool shaft 12, and has a smaller width than an axial length of the inner race. Thus, the journal surface 12B has a smaller area than the inner peripheral surface 26A of the inner race acting as a supporting surface, thereby to diminish the rotational resistance of the spool shaft 12. The journal surface 12B is disposed substantially centrally of the inner peripheral surface 26A of the inner race.

The above embodiment may be modified as follows:

(1) The spool 4 may have journals extending therefrom as integral parts thereof, to dispense with the spool shaft 12.

(2) Each of the journal surfaces 12B may define spline-like grooves extending axially of the spool shaft 12.

(3) The bearings 26 are not limited to the rolling type bearings, but may be slide bearings.

(4) The journal surfaces 12B of the spool shaft 12 may be fitted on outer peripheral surfaces of outer races of the bearings.

What is claimed is:

1. A shaft supporting structure for a fishing reel, comprising:

a bearing provided in a side body;
a supporting surface formed in said bearing;
a support shaft supporting a spool, said support shaft including a journal, said journal supported on said bearing;
said journal including a larger diameter portion and smaller diameter portions located on either side of said larger diameter portion in an axial direction of said journal;
a journal surface formed on an outer periphery of said larger diameter portion, said journal surface being coextensive with said larger diameter portion;
wherein said journal surface and said supporting surface each has a width extending in an axial direction of said journal, the width of said journal surface being shorter than the width of said supporting surface;
wherein a portion of the area of said supporting surface and the entire area of said journal surface are placed in contact with each other when said journal is supported on said bearing; and
wherein said supporting surface and said journal surface are rotatable relative to each other.

2. A shaft supporting structure for a fishing reel, comprising:

a bearing provided in a side body;
a supporting surface formed in said bearing;
a spool shaft supported on said bearing and supporting a spool, said spool shaft including a larger diameter portion and smaller diameter portions located on either side of said larger diameter portion in an axial direction of said spool shaft;
a journal surface formed on an outer periphery of said larger diameter portion, said journal surface being coextensive with said larger diameter portion;
said bearing outwardly engaging and supporting said spool shaft, with a portion of the area of said supporting surface and the entire area of said journal surface being in contact with each other when said spool shaft is supported on said bearing;
wherein said journal surface and said supporting surface each has a width extending in an axial direction of the axis of said spool shaft, the width of said journal surface being shorter than than the width of said supporting surface;
wherein said supporting surface and said journal surface are rotatable relative to each other.

3. A shaft supporting structure for a fishing reel, comprising:

a bearing provided in a side body;
a supporting surface formed in said bearing;
a support shaft supporting a spool, said support shaft including a journal, said journal supported on said bearing;
said journal including a larger diameter portion and smaller diameter portions located on either side of said the larger diameter portion in an axial direction of said journal, said journal surface being coextensive with said larger diameter portion;
a journal surface formed on an outer periphery of said large diameter portion;
wherein said journal surface and said supporting surface each has a width extending in an axial direction parallel of said journal, the width of said Journal surface being shorter than the width of said supporting surface; and
wherein a portion of the area of said supporting surface and the entire area of said journal surface are placed in contact with each other when said journal is supported on said bearing.

4. A shaft supporting structure as claimed in claim 3, wherein said journal is an extension of said support shaft which is rotatable in unison with the spool.

5. A shaft supporting structure as claimed in claim 3, wherein said journal surface is positioned substantially centrally of said supporting surface relative to the direction extending in parallel with the axis of said journal.

6. A shaft-supporting structure for a fishing reel comprising:
   a bearing provided in a side body;
   a supporting surface formed in said bearing;
   a support shaft supporting a spool, said support shaft including a journal, said journal being supported on said bearing;
   said journal including a larger diameter portion and smaller diameter portions located on either side of said larger diameter portion in an axial direction of said journal;
   a journal surface formed on an entire outer periphery of said larger diameter portion, said journal surface being coextensive with said larger diameter portion;
   wherein said journal surface and said supporting surface each has a width extending in an axial direction parallel to said journal, the width of said journal surface being shorter than the width of said supporting surface; and
   wherein a central portion of the area of said supporting surface and the entire area of said journal surface are placed in contact with each other in the axial direction of said journal when said journal is supported on said bearing; and
   wherein opposed ends of said supporting surface relative to the axial direction of said journal and said journal surface are free from contact from each other.

7. A shaft-supporting structure for a fishing reel, comprising:
   a bearing provided in a side body;
   a supporting surface formed in said bearing;
   a support shaft supporting a spool, said support shaft including a journal, said journal being supported on said bearing;
   said journal including a larger diameter portion and smaller diameter portions located on either side of said larger diameter portion in an axial direction of said journal;
   a journal surface formed on an entire outer periphery of said larger diameter portion, said journal surface being coextensive with said larger diameter portion;
   wherein said Journal surface and said supporting surface each has a width extending in an axial direction of said journal, the width of said Journal surface being shorter than the width of said supporting surface;
   wherein a central portion of the area of said supporting surface and the entire area of said journal surface are placed in contact with each other in the axial direction of said journal when said journal is supported on said bearing;
   wherein opposed ends of said supporting surface relative to the axial direction of said journal and said journal surface are free from contact from each other; and
   wherein said supporting surface and said journal surface are rotatable relative to each other.

8. A shaft-supporting structure for a fishing reel, comprising:
   a bearing provided in a side body;
   a supporting surface formed in said bearing;
   a spool shaft supported on said bearing and supporting a spool, said spool shaft including a larger diameter portion and smaller diameter portions located on either side of said larger diameter portion in an axial direction of said spool shaft;
   a journal surface formed on an entire outer periphery of said larger diameter portion, said journal surface being coextensive with said larger diameter portion;
   said bearing outwardly engaging and supporting said spool shaft, with a portion of the area of said supporting surface and the entire surface of said journal surface being in contact with each other when said spool shaft is supported on said bearing;
   wherein said journal surface and said supporting surface each has a width extending in an axial direction of the axis of said spool shaft, the width of said journal surface being shorter than the width of said supporting surface;
   wherein a central portion of the area of said supporting surface and the entire area of said journal surface are placed in contact with each other in the axial direction of said spool shaft when said journal is supported on said bearing;
   wherein opposed ends of said supporting surface relative to the axial direction of said spool shaft and said journal surface are free from contact from each other; and
   wherein said supporting surface and said journal surface are rotatable relative to each other.

* * * * *